(12) United States Patent
Chen

(10) Patent No.: US 8,510,602 B2
(45) Date of Patent: Aug. 13, 2013

(54) TESTING A SOFTWARE APPLICATION USED IN A DATABASE SYSTEM

(75) Inventor: Zhiqiang Chen, San Ramon, CA (US)

(73) Assignee: salesforce.com, inc., San Francisco, CA (US)

(*) Notice: Subject to any disclaimer, the term of this patent is extended or adjusted under 35 U.S.C. 154(b) by 440 days.

(21) Appl. No.: 12/842,988

(22) Filed: Jul. 23, 2010

(65) Prior Publication Data

US 2012/0023373 A1 Jan. 26, 2012

(51) Int. Cl.
*G06F 11/00* (2006.01)

(52) U.S. Cl.
USPC ............ 714/38.1; 714/25; 717/124; 717/125; 717/126; 717/127

(58) Field of Classification Search
USPC ............................ 714/25, 38.1; 717/124–127
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |

(Continued)

*Primary Examiner* — Joshua P Lottich

(74) *Attorney, Agent, or Firm* — Ingrassia Fisher & Lorenz, P.C.

(57) ABSTRACT

A method for testing a software application used in a database system. The method includes receiving multiple changes to the software application, and running a plurality of tests on the software application. The method further includes determining if any of the tests fail, and if any of the tests fail, identifying which changes caused the failures.

12 Claims, 4 Drawing Sheets

(56) References Cited

U.S. PATENT DOCUMENTS

| | | | |
|---|---|---|---|
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,334,162 B1 | 2/2008 | Vakrat et al. | |
| 7,340,411 B2 | 3/2008 | Cook | |
| 7,415,635 B1 * | 8/2008 | Annangi | 714/38.12 |
| 7,503,037 B2 * | 3/2009 | Banerjee et al. | 717/124 |
| 7,620,655 B2 | 11/2009 | Larsson et al. | |
| 7,657,789 B1 * | 2/2010 | Gerber et al. | 714/25 |
| 7,698,160 B2 | 4/2010 | Beaven et al. | |
| 7,793,269 B2 * | 9/2010 | Singonahalli et al. | 717/131 |
| 7,844,955 B2 * | 11/2010 | Tateishi et al. | 717/131 |
| 7,873,944 B2 * | 1/2011 | Bangel et al. | 717/124 |
| 7,900,192 B2 * | 3/2011 | Patterson | 717/125 |
| 7,930,683 B2 * | 4/2011 | Li | 717/124 |
| 8,079,018 B2 * | 12/2011 | Huene et al. | 717/124 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,117,598 B2 * | 2/2012 | Johnson et al. | 717/124 |
| 8,132,157 B2 * | 3/2012 | Dhuvur et al. | 717/124 |
| 8,161,458 B2 * | 4/2012 | Johnson et al. | 717/124 |
| 8,275,836 B2 | 9/2012 | Beaven et al. | |
| 8,276,123 B1 * | 9/2012 | Deng et al. | 717/125 |
| 8,281,187 B1 * | 10/2012 | Desai et al. | 714/38.1 |
| 8,352,916 B2 * | 1/2013 | Ahluwalia et al. | 717/124 |
| 2001/0044791 A1 | 11/2001 | Richter et al. | |
| 2002/0066077 A1 * | 5/2002 | Leung | 717/126 |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0230964 A1 | 11/2004 | Waugh et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0102654 A1 * | 5/2005 | Henderson et al. | 717/126 |
| 2005/0223357 A1 * | 10/2005 | Banerjee et al. | 717/120 |
| 2007/0240116 A1 * | 10/2007 | Bangel et al. | 717/124 |
| 2008/0270987 A1 * | 10/2008 | Weissman | 717/124 |
| 2008/0270993 A1 * | 10/2008 | Tateishi et al. | 717/127 |
| 2009/0089755 A1 * | 4/2009 | Johnson et al. | 717/124 |
| 2009/0113393 A1 * | 4/2009 | Kho et al. | 717/124 |
| 2009/0249298 A1 * | 10/2009 | Blount et al. | 717/125 |
| 2011/0214018 A1 * | 9/2011 | Vidal et al. | 714/25 |
| 2011/0296383 A1 * | 12/2011 | Pasternak | 717/124 |

\* cited by examiner

TESTING A SOFTWARE APPLICATION USED IN A DATABASE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Application, including the present application, are related to each other. Each of the other patents/applications is incorporated by reference herein in its entirety: U.S. patent application Ser. No. 12/856,510 entitled "Test Optimization," filed Oct. 13, 2010.

FIELD OF THE INVENTION

The current invention relates generally to testing a software application used in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Software applications used in the database system are used to facilitate data retrieval as well as to carry out other operations of the database system. To ensure proper and efficient operations of the database system, software applications need to be tested periodically. Unfortunately, testing a software application can be a slow, inefficient process. For example, there can be numerous (e.g., 100,000) automated tests to validate various features of a software application used a database system. On a typical day, there may be over 300 changes made to the application in the form of change lists. Conventionally, to provide per change list results, 100,000 tests would need to be run on each of the 300 change lists, and a user would need to manually compare the results before and after each change list. Such an effort would require a huge number of machines or it would take days to get the resulting data.

BRIEF SUMMARY

In accordance with embodiments, there are provided mechanisms and methods for testing a software application used in a database system. The method includes receiving multiple changes to the software application, and running a plurality of tests on the software application. The method further includes determining if any of the tests fail, and if any of the tests fail, identifying which changes caused the failures.

While the present invention is described with reference to an embodiment in which techniques for testing a software application used in a database system are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided to test a software application used in a database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods testing a software application used in a database system will be described with reference to example embodiments.

System Overview

Figure 1:
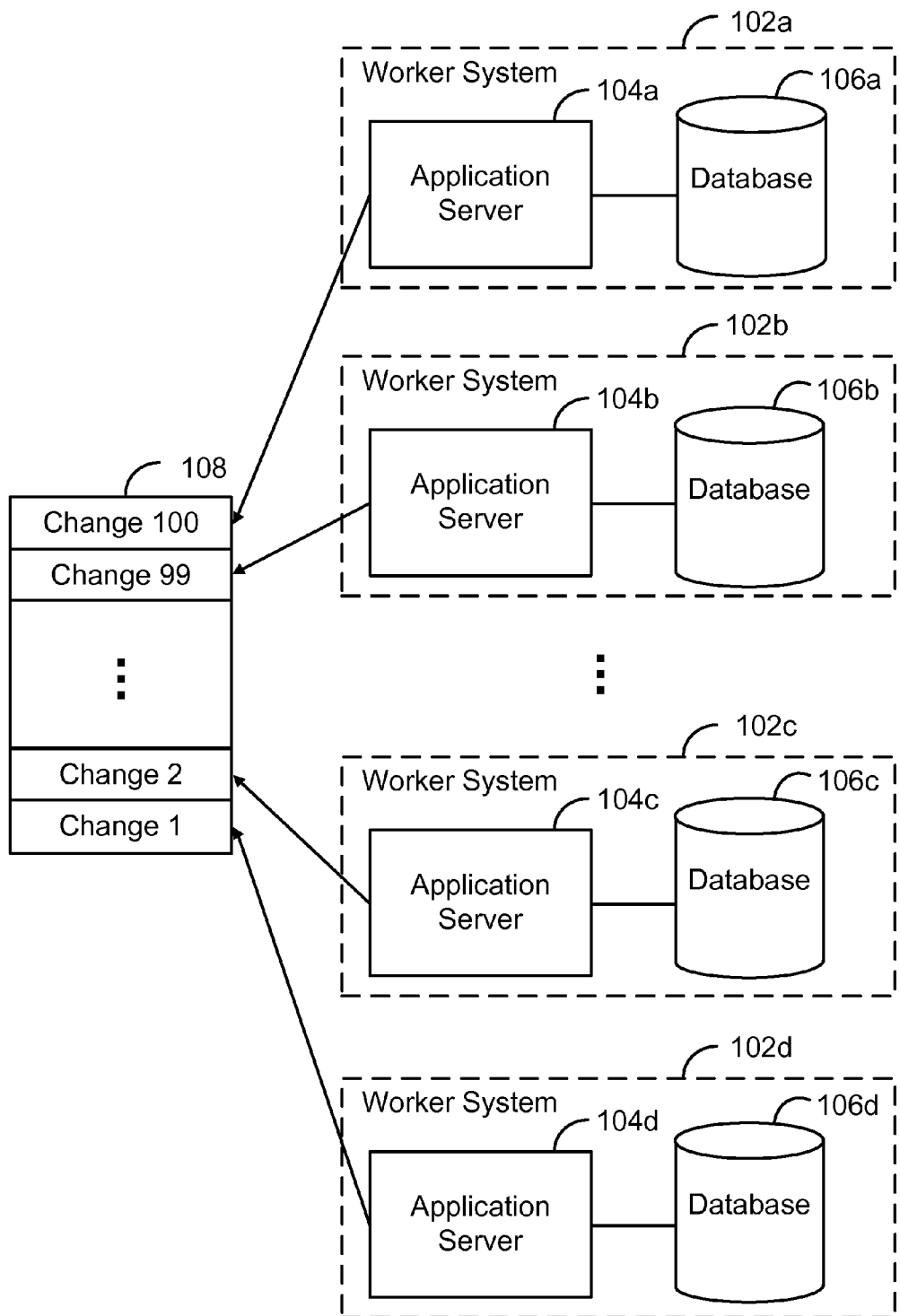
FIG. 1 illustrates a block diagram of an example environment for testing a software application.

FIG. 1 is a block diagram of an example environment 101 for testing a software application, and which may be used to implement the embodiments described herein. As FIG. 1 shows, the environment 101 includes multiple worker systems 102a, 102b, 102c, and 102d. In one embodiment, each worker system 102 includes an application server 104 and a database 106. The application servers are labeled 104a, 104b, 104c, and 104d, and the databases are labeled 106a, 106b, 106c, and 106d. In one embodiment, environment 101 also includes a change queue 108. Change queue 108 may be stored on any suitable database, storage location or computer-readable medium. In one embodiment, each change (e.g., change 100) shown in change queue 108 represents work to be performed by one or more worker systems 102.

For ease of illustration, only 4 worker systems 102 are shown. In one embodiment, each worker system shown (e.g., worker system 102a) may represent one or more worker systems. Also, in one embodiment, more worker systems that are not shown may be used to implement the embodiments described herein. For example, as described in more detail below, each worker system 102 tests one or more versions of a software application in order to identify one or more changes to the software application that caused one or more test failures, where each version contains a new change to the software application (as well as changes from earlier versions).

Figure 2:
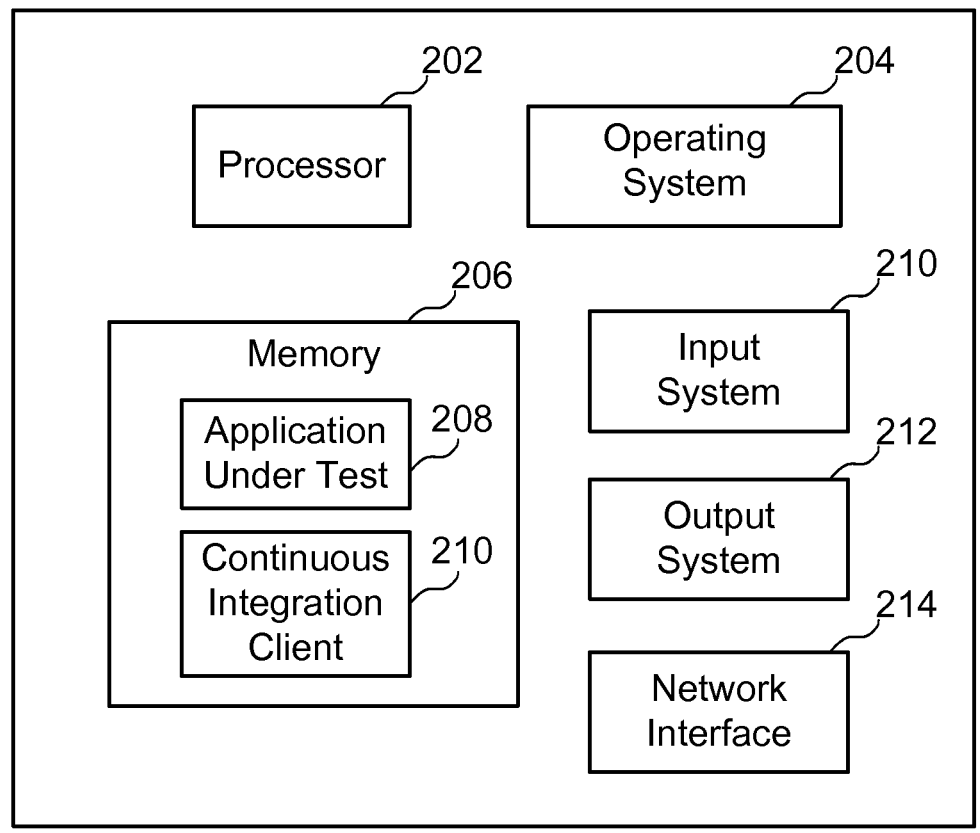
FIG. 2 illustrates a block diagram of an example embodiment of an application server of FIG. 1.

FIG. 2 is a block diagram of an example embodiment of an application server of FIG. 1. As FIG. 2 shows, the application server 104 includes a processor 202, an operating system 204, a memory 206, an application under test 208, a continuous integration client 210, an input system 212, an output system 214, and a network interface 215. Application under test 208 and continuous integrated client 210 may be stored on memory 206 or on any other suitable storage location or computer-readable medium. Application under test 208 provides instructions that enable the processor 202 to perform the functions described herein, such as the steps described in FIGS. 3 and 4. Input system 212 may include input devices such as a keyboard, a mouse, etc., and other means for receiving information from a user and/or from other devices. Output system 214 may include output devices such as a monitor, a printer, etc., and other means for outputting information to a user and/or to other devices.

Various software applications are used in a database system to facilitate data retrieval and to carry out other operations of the database system described above. To ensure proper and efficient operations of the database system, software applications need to be tested periodically, especially as new versions to a given software application are created with new changes that may contain software bugs.

Figure 3:
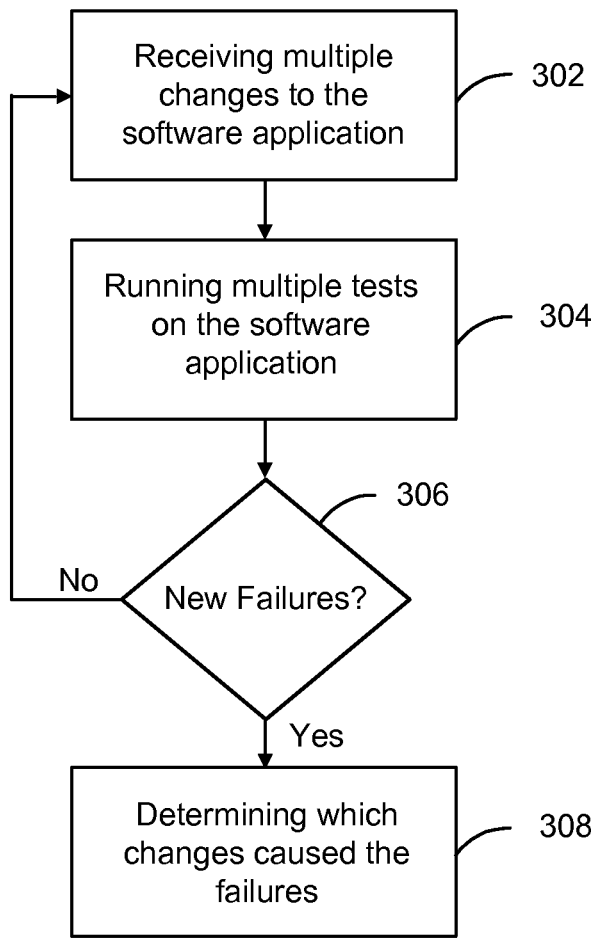
FIG. 3 illustrates an example simplified flow diagram for testing a software application used in a database system.

FIG. 3 shows an example simplified flow diagram for testing a software application used in a database system, according to one embodiment of the invention. The method is initiated in block 302, where worker system 102 (FIG. 1) receives multiple changes (e.g., 100 changes) to the software application (e.g., application under test 208 of FIG. 2). In one embodiment, the changes may be received from one or more users (e.g., software developers) via an input user system 210 (FIG. 2).

Figure 4:
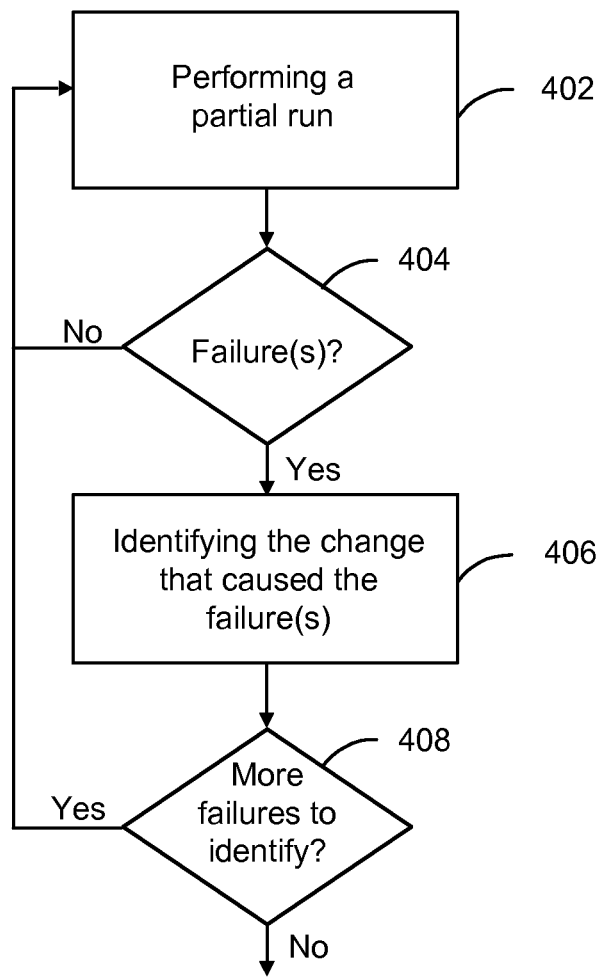
FIG. 4 illustrates an example simplified flow diagram for determining which changes to the software application caused the test failures.

For ease of illustration, the steps of FIGS. 3 and 4 are described as being performed by worker system 102. In one embodiment, worker system 102 represents any number of worker systems, and such a number would be within the spirit and scope of the present invention. For example, one or more worker systems 102 may perform full runs for a given version and partial runs for a given batch of versions. Furthermore, when a given worker system 102 is not currently performing a full run or partial run, that given worker system 102 is available to perform any new full or partial runs that need to be performed.

In block 304, worker system 102 runs multiple tests (e.g., 100,000 tests), referred to as a full run, on the software application. In one embodiment, worker system 102 may run the multiple tests at any predefined time interval (e.g., every minute, every 10 minutes, every hour, etc.) or whenever the worker system 102 determines that resources are available to perform the tests. Accordingly, the one or more changes may accumulate before worker system 102 performs the tests. In block 306, worker system 102 determines if any of the tests failed (e.g., due to software bugs). If not, worker system 102 may deem the most recent changes to be good/passing, and worker system 102 need not perform the tests until worker system 102 receives one or more new changes to the software application. Referring again to block 306, if worker system 102 detects any test failures (e.g., 15 test failures), worker system 102 identifies which changes caused the failures, in block 308. In one embodiment, one change in a give version of the software application may cause one or more test failures. As described in more detail below with respect to FIG. 4, worker system 102 determines which change caused each test failure.

FIG. 4 shows an example simplified flow for determining which change to the software application caused each test failure, according to one embodiment of the invention. The method is initiated in block 402, where worker system 102 (FIG. 2) performs a partial run of the tests on a first version of the software application, where the first version may be defined as the first version containing a change in a predefined set of versions. In one embodiment, the first version is the first of a series of versions in the predefined set of versions, where each successive version contains a new change to the software application and contains the changes from the prior versions of the predefined set.

In one embodiment, each successive change may be assigned a successive number, and each successive change may correspond to a successive version of the software application. For example, in the current example having 100 changes, the first version of the predefined set contains the first change (change 1), the second version contains the second change as well as the first change (change 1 and change 2), the third version contains the third change as well as the first and second changes (change 1, change 2, and change 3), etc. In one embodiment, a given change may be assigned a number based on the time the change was made, where the number is a specific time. As such, the source control system (e.g., processor 202 of FIG. 2) assigns smaller numbers for earlier changes relative to larger numbers for later changes.

In one embodiment, a partial run may be defined as an execution of the failing tests (e.g., 15 failing tests), which is a subset of a full run, which may be defined as the execution of the complete set of tests (e.g., 100,000 tests). In one embodiment, a partial run contains tests that failed during a full run, which contains passing and failing tests. In one embodiment, application under test 208 performs the failing tests on itself.

In one embodiment, the predefined set of versions included in a given partial run may be based on one or more policies. In a first example embodiment, the predefined set of versions may include all of the versions created after the last version where all tests passed. In the example above where 100 changes have been made to the software application, the first version after all tests passed contains one change (e.g., change 1), the second version after all tests passed contains two changes (e.g., change 1 and change 2), the third version after all tests passed contains three changes (e.g., change 1, change 2, and change 3), etc. until the hundredth version, which contains changes 1-100. If all tests passed for the version before the first of the 100 changes were made, there would be no need to test that version. It can be deduced that one or more of the 100 changes caused the 15 failures (as in the current example).

In a second example embodiment, the predefined set of versions may include all of the versions created after at least two consecutive full runs where the tested versions are known to cause the same number of failing tests. For example, if 2 tests failed for two or more consecutive full runs and the next version contained the first of the 100 changes in the example above. If there were 17 tests that failed after the 100 changes were made, it can be deduced that one or more of the 100 changes caused the new 15 newer test failures. The embodiments described herein may be used to determine which changes caused each of the 15 failures.

For ease of illustration, the remainder of the description of FIG. 4 presumes the first example embodiment, where worker system 102 tests the versions created after the last version where all tests passed. In this example, if all tests passed for the version before the first change of the 100 changes were made, there would be no need to test that version. Again, in one embodiment, it may be deduced that one or more of the recent changes (e.g., last 100 changes) caused the 15 test failures.

After worker system 102 performs the partial run on the version containing the first change, in block 404, worker system 102 determines if any tests failed during the partial run. If not, worker system 102 may deem the first change (e.g., change 1) to be good/passing.

Next, in block 402, worker system 102 performs a partial run on the next successive version in the series of versions, and continues to perform the partial run with each successive version until worker system 102 detects one or more tests that fail. If, for example, in block 404, the fifth version containing changes 1-5 caused one or more failures (e.g., 10 failures), in block 406, worker system 102 identifies the change introduced in that fifth version (e.g., change 5) as the change that caused the 10 newly detected test failures.

In block 408, worker system 102 determines if the changes have been identified for all failures. If yes, the process ends. If not, worker system 102 performs the partial run on the next successive version, in block 402, and the process continues until worker system 102 identifies all changes that caused the remaining failures. For example, if the next failure occurs at the tenth version which contains change 10 and there are 5 test failures, worker system 102 would identify change 10 to be the cause for those 5 test failures. The process would then end, and the 2 changes (changes 5 and 10) that caused all 15 test failures would be identified. In one embodiment, worker system 102 may then notify the developers who made changes 5 and 10 that these changes caused the 15 test failures. In one embodiment, the notification may be an email or other suitable notification.

In one embodiment, each version of the software application may be associated with an individual or group of individuals. As such, once it is known which change caused a given test failure, worker system 102 may then notify the individual or group of the test failure/bug so that the individual or group may be responsible for fixing the bug. Once the bug is fixed, a new version of the software application which contains a change that fixes the bug, may be tested to ensure it fixes the bug without introducing more bugs. Embodiments described herein make it easier for the individual to fix bugs, because the particular change that caused bug in the first place is identified by worker system 102.

In one embodiment, the partial runs may have multiple modes. For example, there may be a standard mode and a binary search mode. In one embodiment, in the standard mode, worker system 102 performs the partial run on each change in the batch. As in the example provided above, there is a partial run performed for each change until all bug-causing changes are identified.

While the example above involves a partial run being performed starting at the first/earliest version containing a change (e.g., change 1) within a given batch of versions and then continuing to the last/latest version containing a change (e.g., change 100) of the batch, other approaches are possible. For example, in one embodiment, a partial run may be performed starting at the latest change (e.g., change 100) of a batch and then continuing to the earliest change (e.g., change 1) of the batch. One benefit of performing the partial run from the latest change to the earliest change is that, in some cases, a given version may fail a test due to an early change, later pass due to a later change (e.g., a fix), and then fail again due to an even later change. In one embodiment, as worker system 102 performs a partial run starting at the latest change, and as worker system 102 continues through the versions, worker system 102 performs the steps described above with respect to FIG. 4, except that worker system 102 identifies a change (e.g., change 98) that caused a failure when the version that first introduced that change (e.g., change 98) failed one or more tests that were different from the tests failed by the previous version that failed (e.g., the version containing change 99). Even if the two versions failed the same number of tests, the failing tests being different would indicate that the later change (e.g., change 99) caused the version containing the later change (e.g., change 99) to fail. For example, assume that at change 99, Tests A and B passed, and Tests C and D failed, and assume that at change 98, Tests A and B failed, and Tests C and D passed. This indicates that change 99 fixed aspects of the software application to cause Tests A and B to pass, but also changed aspects of the software application to cause Tests C and D to fail. In one embodiment, worker system 102 may then notify the developer who made change 99 that change 99 caused two the new failures. In one embodiment, the notification may be an email or other suitable notification.

In one embodiment, in the binary search mode, worker system 102 divides the number of changes in the batch into smaller batches and then performs the partial run on each version in a small batch to identify bug-causing changes, until no new failures are found in the remaining batch.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for testing a software application used in a database system, the method comprising:
    receiving multiple successive versions of the software application where each successive version includes a single new change to the software application and changes from one or more prior versions of the software application;
    running a plurality of tests on a version of the successive versions of the software application to identify one or more test failures; and
    responsive to identifying the one or more test failures,
        running a subset of the plurality of tests, where the subset comprises one or more tests that failed, on a first successive version of the software application;
        responsive to determining that the first successive version fails the subset of the plurality of tests, determining that the first successive version caused the one or more test failures of the plurality of tests; and
        responsive to determining that the first successive version passes the subset of the plurality of tests, running the subset of the plurality of tests on one or more remaining successive versions of the software application until a particular successive version fails the subset of the plurality of tests, where the particular successive version is determined to have caused the one or more test failures of the plurality of tests.

2. The method of claim 1, wherein the running of the plurality of tests occurs at predefined intervals.

3. The method of claim 1, wherein the subset of the plurality of tests is a subset of a full run, wherein the full run includes passing tests and failing tests.

4. The method of claim 1, wherein the running the plurality of tests is on a latest version of the successive versions of the software application .

5. The method of claim 4, wherein the running the subset of the plurality of tests comprises:
    running a subset of the plurality of tests on each of the successive versions of the software application based on the test failures to identify which changes caused the test failure.

6. A non-transitory computer-readable storage medium having one or more instructions thereon for testing a software application used in a database system in a multi-tenant database system, the instructions when executed by one or more processors causing the one or more processors to:
    receiving multiple successive versions of the software application where each successive version includes a single new change to the software application and changes from one or more prior versions of the software application;
    running a plurality of tests on a version of the successive versions of the software application to identify one or more test failures; and
    responsive to identifying the one or more test failures,
        running a subset of the plurality of tests, where the subset comprises one or more tests that failed, on a first successive version of the software application;
        responsive to determining that the first successive version fails the subset of the plurality of tests, determining that the first successive version caused the one or more test failures of the plurality of tests; and
        responsive to determining that the first successive version passes the subset of the plurality of tests, running the subset of the plurality of tests on one or more remaining successive versions of the software application until a particular successive version fails the subset of the plurality of tests, where the particular successive version is determined to have caused the one or more test failures of the plurality of tests.

7. The computer-readable storage medium of claim 6, wherein the running of the plurality of tests occurs at predefined intervals.

8. The computer-readable storage medium of claim 6, wherein the subset of the plurality of tests is a subset of a full run, wherein the full run includes passing tests and failing tests.

9. The computer-readable storage medium of claim 6 wherein the running the subset of the plurality of tests is performed when any tests fail.

10. An apparatus for testing a software application used in a database system in a multi-tenant database, the apparatus comprising:
  a hardware processor; and
  one or more stored sequences of instructions which, when executed by the processor, cause the processor to:
  receive multiple successive versions of the software application where each successive version includes a single new change to the software application and changes from one or more prior versions of the software application;
  run a plurality of tests on a version of the successive versions of the software application to identify one or more test failures; and
  responsive to identifying the one or more test failures,
    run a subset of the plurality of tests, where the subset comprises one or more tests that failed, on a first successive version of the software application;
    responsive to determining that the first successive version fails the subset of the plurality of tests, determine that the first successive version caused the one or more test failures of the plurality of tests; and
    responsive to determining that the first successive version passes the subset of the plurality of tests, run the subset of the plurality of tests on one or more remaining successive versions of the software application until a particular successive version fails the subset of the plurality of tests, where the particular successive version is determined to have caused the one or more test failures of the plurality of tests.

11. The apparatus of claim 10, wherein the running of the plurality of tests occurs at predefined intervals.

12. The apparatus of claim 10, wherein subset of the plurality of tests is a subset of a full run, wherein the full run includes passing tests and failing tests.

* * * * *